United States Patent [19]

Konii et al.

[11] Patent Number: 5,075,622

[45] Date of Patent: Dec. 24, 1991

[54] SHEET THICKNESS MEASURING APPARATUS WITH MAGNETIC AND OPTICAL SENSORS

[75] Inventors: Eitaro Konii, Higashi-Kurume; Kohei Hasegawa, Hoya; Yoshinori Tabara, Numazu; Shigeru Ichikawa, Fujinomiya, all of Japan

[73] Assignees: Sumitomo Heavy Industries, Ltd., Tokyo; Meisan Co., Ltd., Fuji, both of Japan; a part interest

[21] Appl. No.: 594,562

[22] Filed: Oct. 9, 1990

[30] Foreign Application Priority Data

Oct. 9, 1989 [JP] Japan .................................. 1-263602

[51] Int. Cl.⁵ ..................... G01B 7/10; G01B 11/06; G01N 21/86
[52] U.S. Cl. .................................. 324/229; 324/226; 356/381
[58] Field of Search ................... 324/226, 229–231; 356/381; 250/559–561

[56] References Cited

U.S. PATENT DOCUMENTS

| | | | |
|---|---|---|---|
| 3,258,686 | 6/1966 | Selgin | 356/381 X |
| 4,182,259 | 1/1980 | Garner et al. | 356/381 X |
| 4,641,525 | 2/1987 | Merki | 324/226 X |

FOREIGN PATENT DOCUMENTS

| | | | |
|---|---|---|---|
| 90206 | 7/1981 | Japan | 324/229 |
| 2167179 | 5/1986 | United Kingdom | 356/381 |

Primary Examiner—Gerard R. Strecker
Attorney, Agent, or Firm—Fleit, Jacobson, Cohn, Price, Holman & Stern

[57] ABSTRACT

A sheet thickness measuring apparatus comprises a metallic back-up surface for supporting the sheet, a magnetic field utilizing sensor disposed above the metallic back-up surface and the sheet for outputting a measured value representative of a distance up to the metallic back-up surface, an optical sensor and a computing unit. The optical sensor comprises a light projecting unit for projecting a beam-like light on a position in the vicinity of the metallic back-up surface on which the sheet is disposed in a lateral direction and a light receiving unit for receiving the projected beam-like light which is disposed on an opposite side of the light projecting unit with respect to the light projected position, so that a measured value representative of the width along which the projected light is shielded by the metallic back-up surface and the sheet may be outputted on the basis of a change in the amount of the light shielded by the metallic back-up surface and the thickness of the sheet on the metallic back-up surface or the amount of the deviation of the position at which the light is shielded or the like. The computing unit computes the thickness of the sheet on the basis of the distance value measured by the magnetic field utilizing sensor and the value of the width of the shielded light measured by the optical sensor.

4 Claims, 4 Drawing Sheets

SHEET THICKNESS MEASURING APPARATUS WITH MAGNETIC AND OPTICAL SENSORS

BACKGROUND OF THE INVENTION

1. Field of the Invention

The present invention relates to a sheet thickness measuring apparatus for measuring the thickness of a sheet of paper, plastics and the like by combinedly using a magnetic field utilizing sensor and an optical sensor.

2. Description of the Prior Art

Conventional sheet thickness measuring apparatus of such a type measures the thickness of a paper sheet 2 by scanning a combined sensor 5 including a magnetic field utilizing sensor 3 such as magnetic sensor or eddy current sensor and an optical sensor 4 along and above a paper sheet 2 disposed on a metallic back-up plate 1 as is schematically shown in FIG. 5 of the attached drawings. In principle, a distance $l_1$ between the surface of the metallic back-up plate 1 and the sensor is measured by the magnetic field utilizing sensor 3 and a distance $l_2$ between the upper surface of the paper sheet 2 and the sensor 4 is measured by the optical sensor 4. The thickness t of the paper sheet 2 at this time is determined by a formula as follows;

$$t = l_1 - l_2$$

However, it is difficult for such a conventional sheet thickness measuring apparatus to determine an exact sheet thickness since a distance value measured by the optical sensor 4 is unreliable if the sheet, the thickness of which is to be measured is transparent. Furthermore, even if the sheet to be measured is opaque, an actual measuring by such a conventional sheet measuring apparatus shows that measuring at an accuracy in the order of about 1/100 mm can be made without any problems while a problem will occur when measuring at an accuracy in the order of about 1/1000 mm. This problem is particularly remarkable when measurement is conducted while the sensor is moved with respect to the metallic back-up plate.

For example, by scanning the combined sensor 5 along and above the surface of the metallic back-up plate 1 on which no paper sheet 2 is disposed, outputs from the magnetic sensor 3 and the optical sensor 4 are recorded and plotted in FIG. 6. FIG. 6(A) shows an example of the output characteristics of the magnetic sensor 3 and FIG. 6(B) shows an example of the output characteristics of the optical sensor 4. Both output characteristics curves of the magnetic sensor 3 and the optical sensor 4 are expected to be same since both sensors measure the same surface. However, comparison of the curves in FIGS. 6(A) and 6(B) clearly shows that the output characteristics curve of the magnetic sensor 3 changes more largely and complicatedly than that of the optical sensor 4 does. Various experiments and references suggest that this is caused by an error of the magnetic sensor due to local magnetization of the metallic back-up plate and non homogeneity of material. If a magnetic material is used for the metallic back-up plate and a magnet or the like is placed on a part of the plate for locally magnetizing the plate to an approximate several gausses and then the sensor is scanned, the output from the magnetic field utilizing sensor exhibits a change of several tens $\mu m$. The output from the magnetic field utilizing sensor exhibits a large change at some place even if inspection of the back-up plate by a Gauss meter having a resolution of 0.1 gauss suggests no change. Same problem will occur even if non-magnetic material is used for the metallic back-up plate and an eddy current magnetic sensor is used. It is deemed that such problem, in particular, an error caused by the magnetic field utilizing sensor hinders an improvement in measurement accuracy of such type of sheet thickness measuring apparatus.

It is an object of the present invention to provide a sheet thickness measuring apparatus which can overcome the aforementioned problems of the prior art.

SUMMARY OF THE INVENTION

According to the present invention, there is provided a sheet thickness measuring apparatus for measuring the thickness of a sheet by using a magnetic field utilizing sensor and an optical sensor along the sheet on a metallic back-up surface characterized in that said magnetic field utilizing sensor is disposed above said metallic back-up surface and said sheet for outputting a measured value representative of a distance between said sensor and said metallic back-up surface and in that said optical sensor comprises light projecting means for projecting a beam-like light on a position in the vicinity of said metallic back-up surface on which said sheet is disposed in a lateral direction and a light receiving means for receiving said projected beam-like light which is disposed on an opposite side of said light projecting means with respect to the light projected position for outputting a measured value representative of the width along which the projected light is shielded by said metallic back-up surface and said sheet on the basis of a change in the amount of the light shielded by said metallic back-up surface and the thickness of the said sheet on said metallic back-up surface or the amount of the deviation of the position at which the light is shielded on the like and in that said apparatus further comprises means for computing the thickness of said sheet on the basis of said distance value measured by said magnetic field utilizing sensor and said value of the width of the shielded light measured by said optical sensor, whereby the sheet thickness can be accurately measured even if the sheet is transparent.

This invention will now be described in further detail with regard to preferred embodiments as illustrated in the accompanying drawings.

DESCRIPTION OF THE PREFERRED EMBODIMENTS

Figure 1:
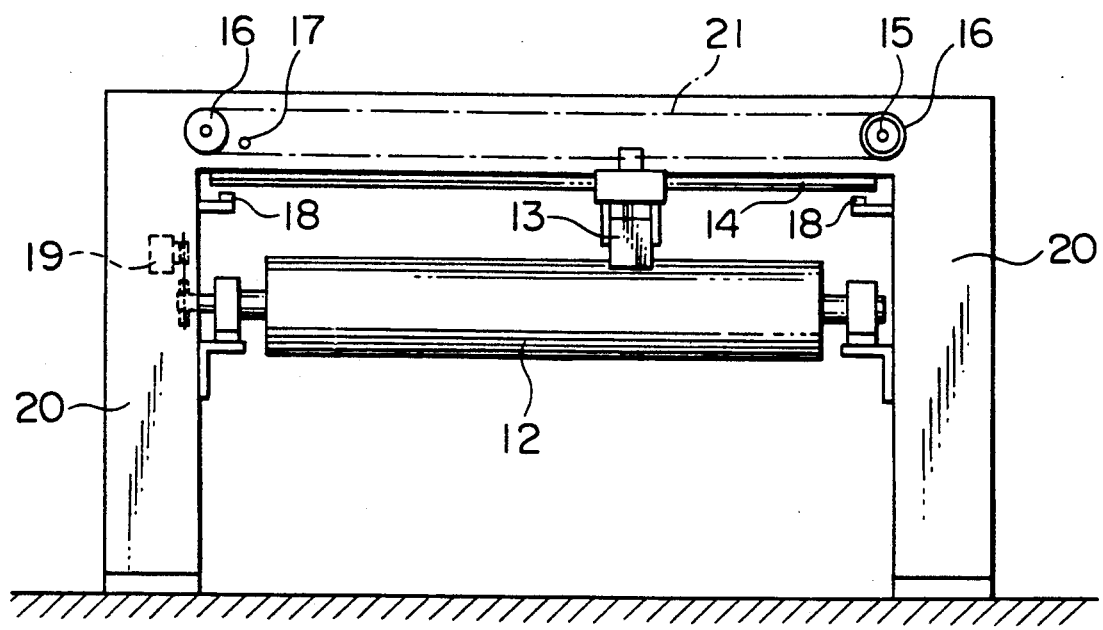
FIG. 1 is a front view showing the schematic structure of a sheet thickness measuring apparatus which is an embodiment of the present invention.

As is best shown in FIG. 1, a metallic back-up roll 12 is supported by and between supporting frames 20 at opposite sides thereof. A linear rail 14 is also supported by and between the supporting frames 20 so that the rail 14 is disposed above the metallic back-up roll 12 in a spaced and parallel relationship with the roll 12. A sheet thickness sensor 13 comprising a magnetic field utilizing sensor and an optical sensor which are integral with each other is slidably supported on the linear rail 14. The sheet thickness sensor 13 is connected with a chain 21 which is engaged with and extends between chain wheels 16 which are driven by a scanning stepping motor 15 so that the sensor 13 is moved along the linear rail 14 by the actuation of the scanning stepping motor 15. A home position detecting proximity switch 17 is disposed in the vicinity of the wheel which is positioned on the left side in FIG. 1. Scanning limit switches 18 are disposed in the vicinity of the opposite sides of the linear rail 14. The supporting frame 20 is provided with a roll rotation detecting transducer 19 for detecting the rotational position of the metallic back-up roll 12.

Figure 2:
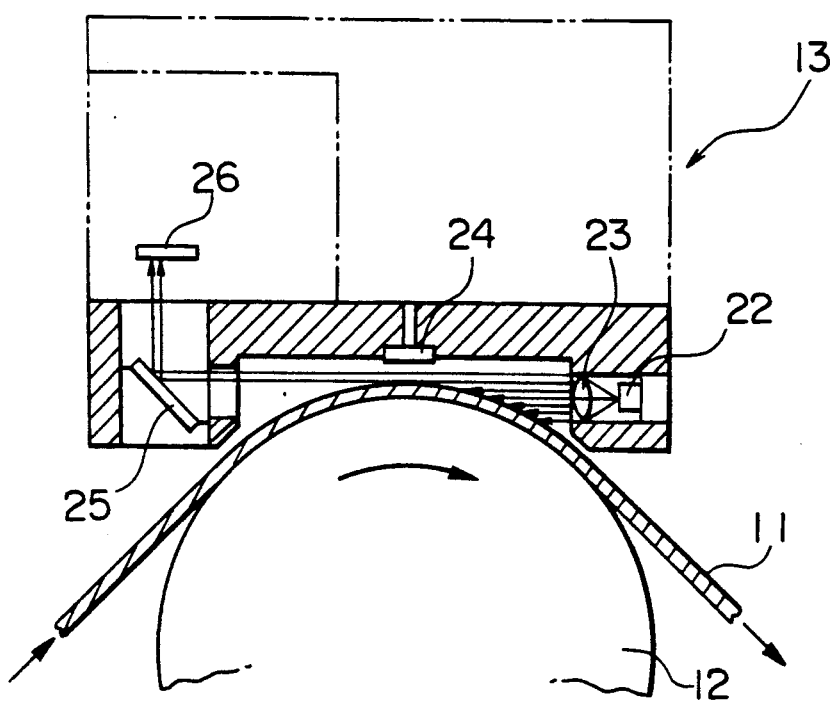
FIG. 2 is an enlarged side view showing the sheet thickness measuring apparatus of FIG. 1.

As is best shown in FIG. 2, the sheet thickness sensor 13 comprises a magnetic field utilizing sensor 24 which is disposed above the metallic back-up roll 12, and an optical sensor including a light projecting device having a semiconductor laser 22 and a lens 23 and a light receiving device 26 having a mirror 25, and a PSD or CCD which are integrally assembled. The semiconductor laser 22 is adapted to emit a beam-like light through the lens 23 in a lateral direction so that the light passes tangentially to a position of the back-up roll 12 where the sheet 11 is disposed in the vicinity thereof and the light receiving device 26 is disposed on a position which is opposite to the semiconductor laser 22 in a diametric direction with respect the metallic back-up roll 12 for receiving the beam-like light via the mirror 25. A light source is not limited to a semiconductor laser and may be LED or the like.

Figure 3:
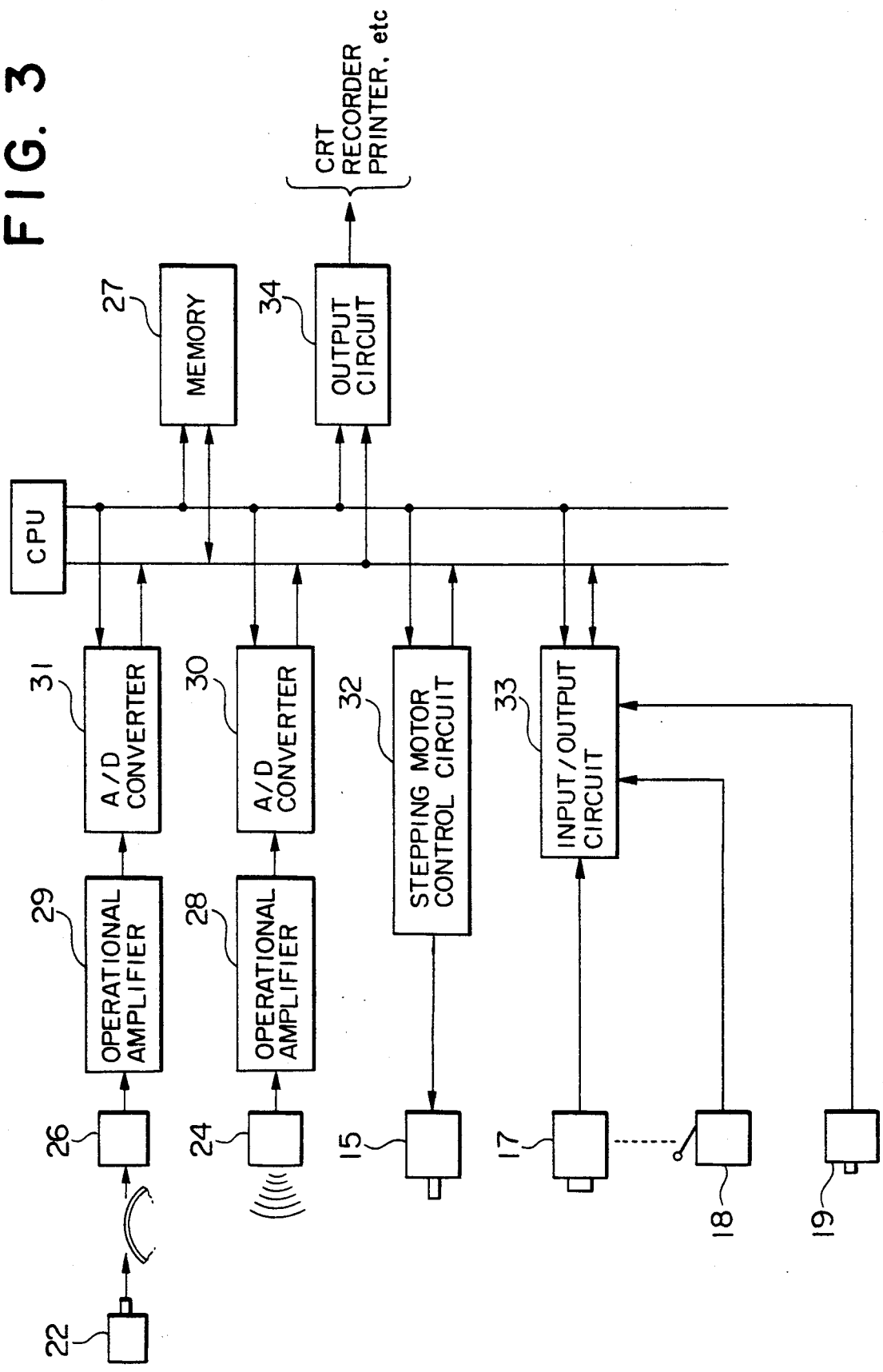
FIG. 3 is a block diagram schematically showing the structure of a control unit of the sheet thickness measuring apparatus of FIGS. 1 and 2.

As shown in FIG. 3, the control unit mainly comprises a central processor CPU including a microcomputer and the like, memory 27 for storing various measured data, and operational amplifier 28 which amplifies a signal of a distance measured by the magnetic field utilizing sensor 24 of the sheet thickness sensor 13, an operational amplifier 29 which processes a signal of the width of the shielded light measured by the optical sensors 22 and 26 of the sheet thickness sensor 13, A/D converters 30 and 31 which convert the measurement analog signals which have been operated and amplified by the operational amplifiers 28 and 29 into digital signals, a stepping motor control circuit 32 for controlling the actuation of the scanning stepping motor 15, an input and output circuit 33 for the home position detecting proximity switch 17, the scanning limit switch 18 and an output circuit 34 for outputting the results of the measurement to a CRT, a recorder and a printer and the like.

Now operation of the thus formed sheet thickness measuring apparatus for measuring the thickness of a sheet will be described.

When a sheet is not disposed on the metallic back-up roll 12, the central processor CPU first sends an instruction to the scanning stepping motor 15 for causing the sheet thickness sensor 13 to move to the home position. That is, the sheet thickness sensor 13 is moved by actuating the scanning stepping motor 15 to a position where the home position detecting proximity sensor 17 is actuated by the sheet thickness sensor 13. Scanning by the sheet thickness sensor 13 is then commenced from the home position. This scanning is referred to as reference value storing scanning for reading a reference value. The sensor 13 is driven by the scanning stepping motor 15 in synchronization with pulses from the rotation detecting transducer 19 of the back-up roll 12. That is, the sensor 13 is constantly scanned along a given spiral path on the back-up roll 12. Every time when the sensor 13 has been scanned over a given distance, a signal representative of a measured distance between the magnetic field utilizing sensor 24 and the roll surface is sent through the operational amplifier 28 and the A/D converter 30 to the memory 27 where the signal is stored as a digital data and a signal representative of the width of the shielded light is sent from the light receiving device 26 of the optical sensor through the operational amplifier 29 and the A/D converter 31 to the memory 27 where the signal is stored as a digital data. The shielded light width measuring signal which is outputted from the light receiving device 26 is based upon a change in the amount of the beam-like light from the light projector 22, which is shielded by only the metallic back-up roll at each measuring point and the amount of deviation of the shielding position of the light. In other words, the signal may be regarded as representing a change in the distance between the sheet thickness sensor 13 and the roll surface at each measuring point. Thus, the magnetic characteristics at each measuring point on the scanning line can be determined as an initial condition by comparing the signal with the corresponding output from the magnetic field utilizing sensor 24.

Next scanning (referred to as scanning for measurement) is conducted while a sheet to be measured is disposed on the metallic back-up roll 12. Similarly to the scanning for storing reference values, the sheet thickness sensor 13 is moved again from the home position and each time when the sheet thickness sensor 13 reaches each measuring point, the central processor CPU causes the memory 27 to store a current distance value representative of a distance between the magnetic field utilizing sensor 24 and the upper surface of the metallic back-up roll 12 which is measured by the sensor 24 and a current value representative of the shielded light width due to the thickness of the metallic back-up roll and the sheet 11 which is measured by the light receiving device 26 of the optical sensor.

The central processor CPU computes the thickness of the sheet based on these measured distance values and the measured shielded light widths which are stored in the memory 27 for outputting it via the output circuit 34. The basic principle of the computation will now be described with reference to FIG. 4.

Figure 4:
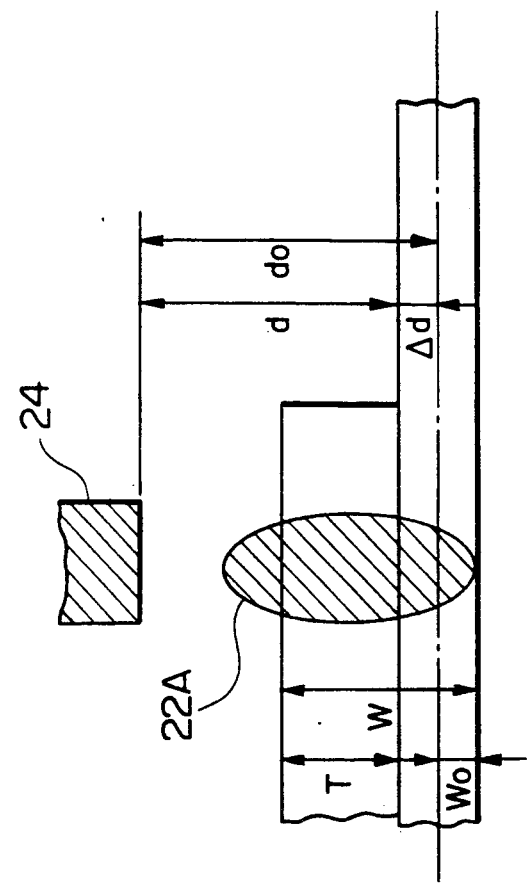
FIG. 4 is a schematic view explaining the measuring principle of the sheet thickness measuring apparatus shown in FIGS. 1 through 3.
Figure 5:
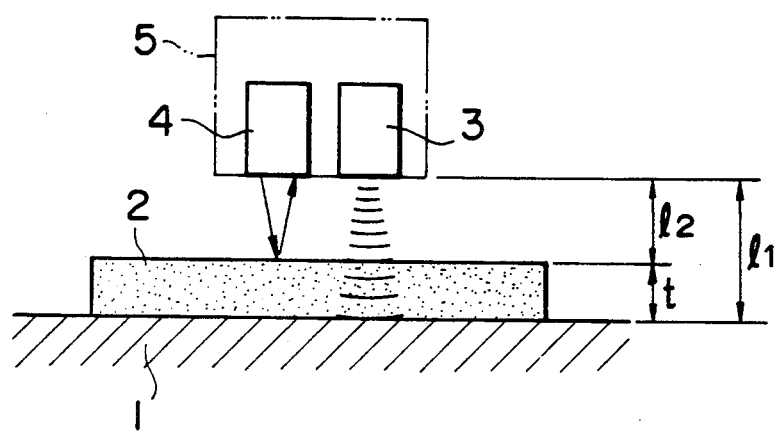
FIG. 5 is a schematic view explaining the principle of an example of a conventional sheet thickness measuring apparatus.
Figure 6A:
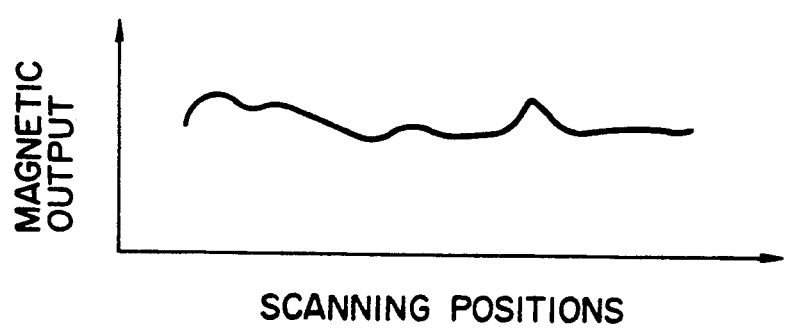
FIGS. 6(A) and 6(B) are graph exemplarily showing change in measured value for explaining problem of the conventional apparatus of FIG. 5.
Figure 6B:
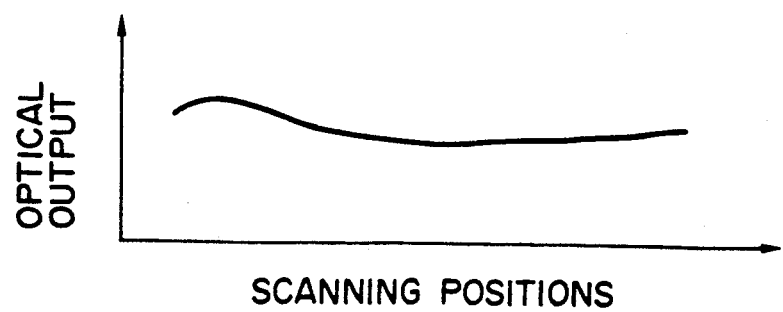

In FIG. 4, reference symbol T denotes the thickness of the sheet, a reference symbol $W_0$ denotes the measured value of the width of the light shielded by only the metallic backup roll 12, a reference symbol W denotes the measured value of the width of the light shielded by the metallic back-up roll 12 and the sheet 11, a reference symbol $d_0$ denotes the distance value measured by the magnetic field utilizing sensor 24 under a condition that the sheet is not disposed on the roll 12, a reference symbol d denotes a distance value measured by the magnetic field utilizing sensor 24 under a condition that the sheet 11 is disposed on the roll and reference 22A indicates a beam of light from the semiconductor laser 22. As is apparent from FIG. 4, the thickness T of the sheet 11 is determined by a following formula.

$$T = W - (W_0 + \Delta d)$$

wherein $\Delta d = d_0 - d$.

As is shown by this formula, a true sheet thickness T can be determined by calculating a very small amount of change $\Delta d$ which is a difference between $d_0$ and $d$, and by compensating for the shielded light width $(W - W_0)$ due to the sheet thickness determined by the optical sensor under a condition that the sheet is disposed on the roll even if there is a small change in the distance between the magnetic field utilizing sensor and the metallic back-up roll surface due to vibration of the apparatus or the scanning inaccuracy of the sheet thickness sensor.

Although the metallic back-up roll is used to provide a measurement reference surface in the aforementioned embodiment, the present invention may be equally applicable to a case in which a metallic back-up plate is used to provide a measurement reference surface. In this case, it is important that the light projector and the light receiving device of the optical sensor are disposed to overhang the metallic back-up plate in a direction of the width thereof for presetting such an incident angle of the beam-like light that the light transmitted from the light projector and the light receiving device will be intercepted by the thickness of the sheet on the metallic back-up plate.

The sheet thickness measuring apparatus of the present invention can measure the thickness of a sheet at a very high accuracy even if the sheet, the thickness of which is to be measured is transparent or there is a small problem about vibration of the apparatus and/or the scanning accuracy since the apparatus operates based on the aforementioned structure.

What is claimed is:

1. A sheet thickness measuring apparatus for measuring the thickness of a sheet on a metallic back-up surface, said apparatus comprising:

a sheet thickness sensor comprising a magnetic field utilizing sensor and an optical sensor which are integral with each other, said magnetic field utilizing sensor being disposed above said metallic back-up surface and said sheet for outputting a measured distance value representative of a distance between said sensor and said metallic back-up surface and said optical sensor comprising light projecting means for projecting a beam-like light on a position in the vicinity of said metallic back-up surface on which said sheet is disposed in a lateral direction and a light receiving means disposed at a side of said metallic back-up surface opposite to said light projecting means for receiving said projected beam-like light and outputting a measured shielded light width value representative of the width along which the projected light is shielded only by said metallic back-up surface and said sheet on the basis of a change in the amount of the light shielded only by said metallic back-up surface and the thickness of said sheet on said metallic back-up surface or the amount of the deviation of the position at which the light is shielded;

scanning means for relatively moving said sheet thickness sensor in parallel to said metallic back-up surface in a predetermined direction;

memory means;

writing means for storing a measured distance value $d_0$ from said magnetic field utilizing sensor and a measured shielded light width value $W_0$ from said optical sensor in said memory means each time when said sheet thickness sensor reaches each measuring point in reference value storing scanning of said sheet thickness sensor by said scanning means wherein no sheet is disposed on said metallic back-up surface, and for storing a measured distance value d from said magnetic field utilizing sensor and a measured shielded light width value W from said optical sensor in said memory means each time said sheet thickness sensor reaches each measuring point in scanning for measurement of said sheet thickness sensor by said scanning means wherein said sheet is disposed on said metallic back-up surface; and computing means for reading measured distance values $d_0$ and d and measured shielded light width values $W_0$ and W corresponding to each measuring point out of said memory means, and for performing arithmetic operation according to the following formula:

$$T = W - (W_o + d_0 - d)$$

to determine the thickness T of said sheet at each measuring point.

2. A sheet thickness measuring apparatus as defined in claim 1 and further including means for storing said distance values and said shielded light width values which are measured by said magnetic field utilizing sensor and said optical sensor when said sheet is and is not disposed on said metallic back-up surface, said computing means being adapted to compute the thickness of said sheet on the basis of said measured distance value and said measured shielded light width.

3. A sheet thickness measuring apparatus as defined in claim 1 in which said metallic back-up surface is a surface of a metallic back-up roll and in which said light projecting means and said light receiving means of said optical sensor are disposed in such a manner that they overhang said metallic back-up roll in a diametric direction thereof.

4. A sheet thickness measuring apparatus as defined in claim 1 in which said metallic back-up surface is a surface of a metallic back-up plate and in which said light projecting means and said light receiving means of said optical sensor are disposed in such a manner that they overhang said metallic back-up plate in a width direction thereof.

* * * * *